United States Patent
Lynch et al.

(10) Patent No.: US 9,069,385 B1
(45) Date of Patent: Jun. 30, 2015

(54) COMMUNICATING PHYSICAL GESTURES AS COMPRESSED DATA STREAMS

(75) Inventors: John D. Lynch, Olathe, KS (US); Brian D. Mauer, Shawnee, KS (US); Larry D. Cummings, Raytown, MO (US); Pedro A. Zamora, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1729 days.

(21) Appl. No.: 12/350,778

(22) Filed: Jan. 8, 2009

(51) Int. Cl.
G06F 3/14 (2006.01)
G06F 3/01 (2006.01)
G06K 9/00 (2006.01)

(52) U.S. Cl.
CPC ............ *G06F 3/017* (2013.01); *G06K 9/00355* (2013.01)

(58) Field of Classification Search
USPC .......................................... 715/863, 864, 865
See application file for complete search history.

(56) References Cited

U.S. PATENT DOCUMENTS

| | | |
|---|---|---|
| 5,699,441 A | 12/1997 | Sagawa et al. |
| 5,953,693 A * | 9/1999 | Sakiyama et al. ............... 704/3 |
| 6,256,033 B1 * | 7/2001 | Nguyen ....................... 715/863 |
| 2005/0271279 A1 * | 12/2005 | Fujimura et al. ............. 382/203 |
| 2006/0268300 A1 * | 11/2006 | Suzuki ........................... 358/1.9 |
| 2010/0023314 A1 * | 1/2010 | Hernandez-Rebollar ........ 704/3 |

* cited by examiner

*Primary Examiner* — Thanh Vu

(57) ABSTRACT

Computer-readable media and systems for communicating physical gestures as compressed data streams are provided. In particular, a technique is employed for generating replicated physical gestures on a user-interface display to visibly communicate sign language without transmitting information standard to typical video sessions, such as audio or video frames. In general, the technique entails the following steps: receiving coordinate representations of user-initiated physical gestures (e.g., hand movements); deciphering the received coordinate representations to identify corresponding motion patterns; and conveying the motion patterns to a presentation component for rendering. Rendering involves replicating the physical gestures by providing animations that carry out the motion patterns. The coordinate representations are generally received from a mobile device that captures physical gestures of a sender by employing a position-tracking interface. Upon capturing the physical gestures, the mobile device maps the coordinate representations to the physical gestures and records/transmits the coordinate representations at a high-speed frame rate.

20 Claims, 5 Drawing Sheets

COMMUNICATING PHYSICAL GESTURES AS COMPRESSED DATA STREAMS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Generally, providing services for remote communication between individuals is a goal of the telecommunications industry. But, since the invention of the telephone, implementing remote communications for the hearing impaired has been difficult, especially across communications pathways established for hearing-enabled users. For instance, "Deaf Relay Services" support video sessions between the hearing impaired and other users, thereby facilitating remote communication. Disadvantageously, fast frames rates are required to provide sufficient video quality for communicating hand gestures such that they may be accurately recognized by a user. As such, high-bandwidth channels (e.g., wired IP connections) are required to support a sign language conversation over a video session.

As such, employing a technique for generating replicated physical gestures on a user-interface (UI) display to visibly communicate sign language without transmitting corollary information (e.g., audio, color, background motion, and data important to typical video sessions) would enhance a hearing-impaired user's experience when attempting to interact with a remote user over conventional communication pathways.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention provide computer-readable media having computer-executable instructions embodied thereon, a computer system, and computerized methods for, among other things, communicating physical gestures as compressed data streams. In particular embodiments, an innovative technique is employed for generating replicated physical gestures on a user-interface (UI) display to visibly communicate sign language without transmitting corollary information (e.g., audio, color, background motion, and data important to typical video sessions). In general, the innovative technique entails the following steps, in no specific order: receiving coordinate representations of one or more user-initiated physical gestures; deciphering the received coordinate representations to identify corresponding motion patterns; and conveying the motion patterns to a presentation component for rendering. In exemplary embodiments, rendering involves replicating the physical gestures by providing animations that correspond to the motion patterns.

In instances of the present invention, the coordinate representations are received from a mobile device that captures physical gestures of a sender by employing a position-tracking interface. Upon capturing the physical gestures, the mobile device may implement a process that includes mapping the coordinate representations to the physical gestures and recording, at least temporarily, the coordinate representations at a high-speed frame rate. By way of example, the high-speed frame rate may be greater than about 14 frames per second. Because the high-speed frame rate preserves the accuracy of the physical gestures (e.g., hand motions of the sender), while the transmission of data (e.g., coordinate representations), as opposed to video frames, requires minimal bandwidth, a hearing-impaired user's experience is enhanced when attempting to interact with a remote user over conventional communication pathways.

BRIEF DESCRIPTION OF THE DRAWINGS

The present invention is described in detail below with reference to the attached drawing figures, wherein.

DETAILED DESCRIPTION

Figure 1:
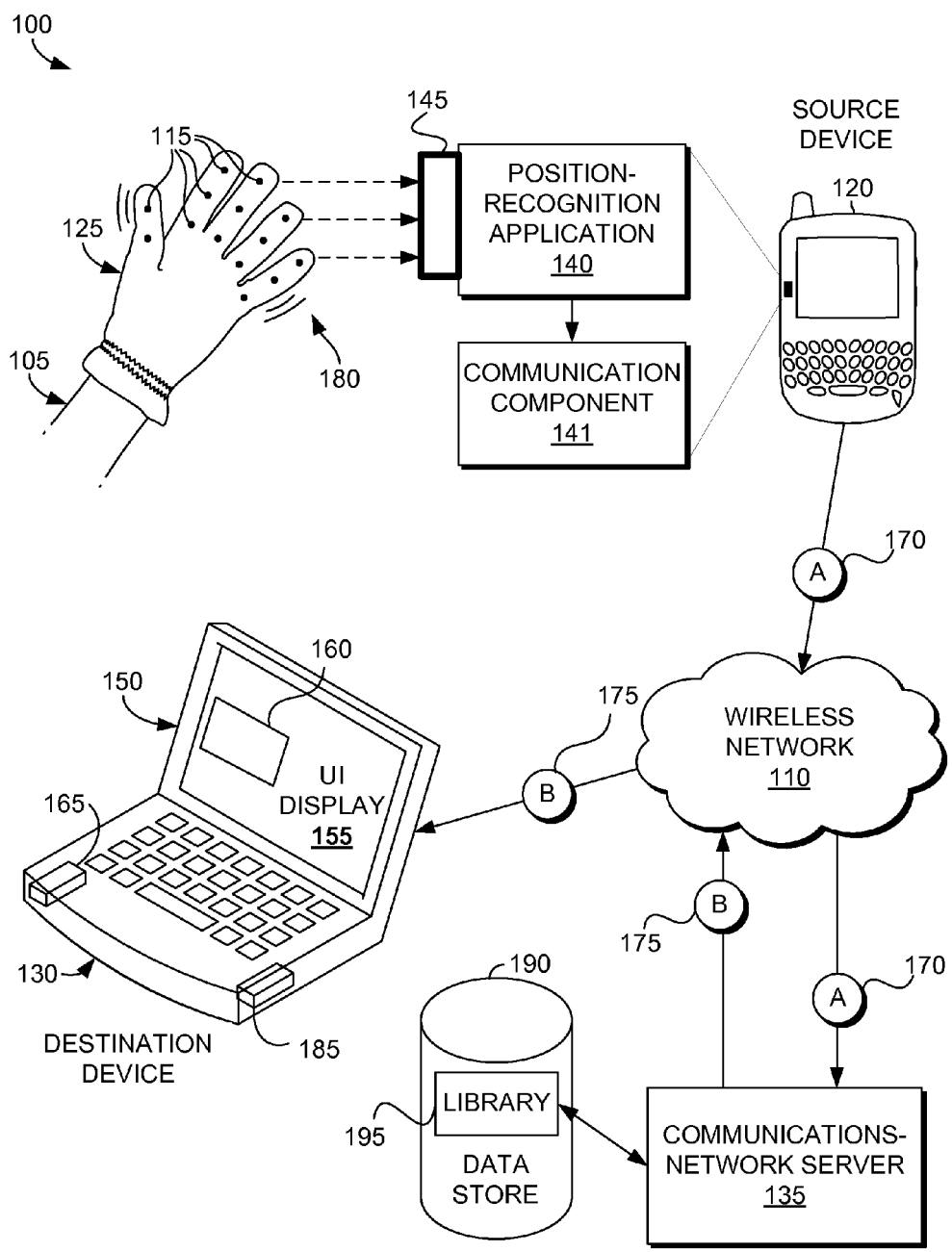
FIG. 1 is a schematic diagram of an exemplary computing environment suitable for use in implementing embodiments of the present invention.

The subject matter is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide computer-readable media having computer-executable instructions embodied thereon, a computer system, and computerized methods for tracking user-initiated physical gestures, communicating instances of the physical gestures as coordinate representations, and animating a computer-model simulation of the physical gestures upon deciphering the coordinate representations.

Acronyms and Shorthand Notations

Throughout the description, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

ASL American Sign Language
LANs Local Area Networks
PDA Personal Digital Assistant
UI User Interface
WANs Wide Area Networks Further, various technical terms are used throughout this description. A definition of such terms can be found in *Newtons Telecom Dictionary* by H. Newton, $22^{nd}$ Edition (2006). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate embodiments may be embodied as, among other things, a computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. By way of example, computer-readable media comprise media implemented in any method or technology for storing information. Examples of stored information include computer-useable instructions, data structures, program modules, and other data representations. Media examples include information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Accordingly, in one aspect, the embodiments of the present invention provide one or more computer-readable media having computer-executable instructions embodied thereon that, when executed, perform a method for communicating physical gestures across a wireless network as a compressed data stream. In embodiments, the method includes receiving within the data stream coordinate representations of one or more user-initiated physical gestures captured by a position-tracking interface on a mobile device. In one instance, capturing includes recording the coordinate representations at a high-speed frame rate that scans more frames per temporal increment than a frame rate of a video-media stream (e.g., scanning at a rate between 15 and 30 frames per second). These coordinate representations are utilized, in part, to identify corresponding predefined motion patterns. The motion patterns are conveyed to a presentation component for rendering thereby. In an exemplary embodiment, rendering comprises replicating the one or more physical gestures by animating the motion patterns with a computer-generated model.

In another aspect, a computerized method for communicating sign language across a wireless network is provided. In embodiments, the method for communicating sign language includes capturing coordinate representations of user-initiated physical gestures that are associated with sign language. In one instance, capturing relates to locating traceable elements disposed on a wearable input device. In another instance, capturing relates to tracking the traceable elements at high-speed frame rate to recognize physical gestures. Typically, the physical gestures include discrete spatial movements of the wearable input device. In embodiments, the method of communicating sign language further includes conveying the coordinate representations via a wireless network for rendering at a remote presentation component. In one instance, rendering comprises replicating the physical gestures upon deciphering the coordinate representations. In another instance, the replicated physical gestures are animated with a computer-generated model surfaced at a display device.

In yet another aspect, embodiments of the present invention relate to a computer system embodied on one or more computer storage-media having computer-executable instructions provided thereon for performing a method for rendering a computer-generated model of physical gestures conveyed as reduced-bandwidth streaming data across a wireless network. In an exemplary embodiment, the computer system includes a mobile device, a communications-network server, a deciphering application accommodated by the device and/or the server, and a presentation component residing on the device, the server, at a stand-alone processing unit, or a combination thereof. In an exemplary embodiment, the mobile device is configured to accommodate a position-tracking interface for capturing coordinate representations of one or more user-initiated physical gestures at a high-speed frame rate. The communications-network server, in embodiments, is configured for receiving the coordinate representations carried via the reduced-bandwidth streaming data. Generally, the deciphering application is configured for assigning the received coordinate representations corresponding predefined motion patterns, while the presentation component is configured for reconstructing the physical gestures by animating the motion patterns with a computer-generated model. In other embodiments, the computer system may include a data store that accommodates a library for storing a catalog of the predefined motion patterns that, incident to interrogation with the coordinate representations, yields at least one motion pattern from a catalog which substantially maps to the coordinate representations.

Generally, embodiments of the present invention relate to capturing a physical gesture articulated by a sender, or user of a mobile device. As used herein, the phrase "physical gesture" is not meant to be limiting and may encompass any user-initiated movement that, at sometime during execution, is capable of being detected by a position-tracking interface of the mobile device. For instance, physical gestures may include, but are not confined to, manual motions, handwriting actions, sign language articulations (e.g., American Sign Language (ASL) movements), physical gesticulations, shaking, pivoting, two-dimensional or three-dimensional discrete spatial movements, and other user-initiated inputs to the position-tracking interface. As more fully discussed below, based on the user-initiated input provided by the user, the mobile device may generate a corresponding coordinate representation that invokes a particular action to be presented on a receiving device. By way of example, a user-initiated hand movement that articulates the sign-language gesture of a word or phrase may be captured as a plurality of frames of coordinate representations, which in turn may be recognized motion patterns. In this case, the motion patterns may be mapped to animations that replicate the original word or phrase sign-language gesture.

Although various different movements and/or gestures for generating corresponding animations via coordinate representations have been described above, it should be understood and appreciated by those of ordinary skill in the art that various other gestures carried out in the proximity of the position-tracking interface are contemplated herein, and that embodiments of the present invention are not limited to those gestures and actions shown and described. For instance, a lip movement-type of user-initiated input may be recorded as a coordinate representation and subsequently recognized as a motion pattern that is reproduced as a mouth animation for those who prefer lip-reading.

Having briefly described an overview of embodiments of the present invention and some of the gestures featured therein, an exemplary operating environment suitable for implementing the present invention is described below.

Referring to the drawings in general, and initially to FIG. 1 in particular, a schematic diagram of an exemplary operating environment is shown and designated generally as system 100 configured to capture coordinate representations 170 of one or more physical gestures 180 executed by a user 105 and to decipher the coordinate representations 170 to identify corresponding motion patterns 175 for facilitating replication of the physical gestures 180 as an animation. It should be understood that this and other arrangements described herein are set forth only as examples. Other arrangements and elements (e.g., machines, interfaces, functions, orders, and groupings of functions, etc.) can be used in addition to, or instead of, those shown, and some elements may be omitted altogether. Further, many of the elements described herein are functional entities that may be implemented as discrete or distributed components/devices or in conjunction with other components/devices, and in any suitable combination and location. Various functions described herein as being performed by one or more entities may be carried out by hardware, firmware, and/or software. For instance, various functions may be carried out by a processor executing instructions stored in memory, as discussed supra.

With continued reference to FIG. 1, an exemplary system architecture is illustrated that shows the exemplary system 100 configured to communicate the physical gestures 180 across a wireless network 110 as a data stream (e.g., reduced bandwidth streaming data). Initially, the system 100 includes a source device 120, a communications-network server 135, and a destination device 130 operably coupled over the wireless network 110. In embodiments, one or more of the devices 120 and 130 may take the form of a mobile device that is configured to transmit/receive communications via a wireless connection. Further, the mobile device may be configured to move within the system 100, thereby causing rerouting of the wireless connection through the wireless network 110 as appropriate. Generally, the mobile device may be any type of device having communications capability. For instance, the mobile device may be, or variously referred to as, a handheld device, mobile handset, consumer electronics device, cell phone, personal digital assistant (PDA) unit, and the like.

In addition, each mobile device is provisioned with hardware that facilitates transmission and reception of signals over the wireless connection. These signals may include data packets, streaming data, and other communications that are consistent with a call, data session, etc. These communications may be transmitted/received at the commencement or ending of establishing the wireless connection, or at any time(s) therebetween.

In other embodiments, the devices 120 and 130 may comprise a computing device. By way of example only and not limitation, the computing device may be a personal computer, desktop computer, laptop computer, consumer electronic device, handheld device, various servers, and the like. It should be noted, however, that embodiments of the present invention are not limited to implementation on such computing devices, but may be implemented on any of a variety of different types of computing devices within the scope of the embodiments of the present invention.

Typically, each of the devices 120 and 130 include, or is linked to, some form of a computing unit (e.g., central processing unit, microprocessor, etc.) to support operations of the component(s) running thereon (e.g., position-recognition application 140 or presentation component 165). As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the devices 120 and 130 to enable each device to perform communication-related processes and other operations (e.g., capturing physical gestures 180, conveying coordinate representations 170, identifying corresponding motion patterns 175, and the like). In another instance, the computing unit may encompass a processor (not shown) coupled to the computer-readable medium accommodated by each of the devices 120 and 130. Generally, the computer-readable medium stores, at least temporarily, a plurality of computer software components that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions (e.g., reconstructing the physical gestures by presenting animations of the motion patterns).

Also, beyond processing instructions, the processor may transfer information to and from other resources that are integral to, or disposed on, the devices 120 and 130. Generally, resources refer to software and hardware mechanisms that enable the devices 120 and 130 to perform a particular function. By way of example only, the resources may include one or more of the following mechanisms: imaging apparatuses (e.g., position-tracking interface 145); data stores (e.g., data store 190); printing devices; paging systems; audio alert devices; and media-display units (e.g., monitor 150).

Generally, the source device 120 may establish a wireless connection, path, or channel over a wireless air interface, such as the wireless network 110, that supports transporting a data stream. In addition, the source device 120 may include a position-tracking interface 145 for monitoring physical gestures 180 of the user 105. Generally, the position-tracking interface 145 includes a position-sensing device that is configured for recording each discrete spatial movement of a complete physical gesture 180. In other words, the position-tracking interface 145 is a component of a tracking system capable of tracking the user's 105 body movements for rendering in virtual space. In one instance, the position-sensing device may be a camera (e.g., digital image capturing tool) to record individual frames of the physical gesture 180, where each frame captures a discrete spatial movement. These frames may be appended with a sequence indicia in order to organize the frames according to a timely ordering, as more fully discussed below.

In another embodiment, the position-sensing device may include video recording capability to capture movements of a wearable apparatus, where capturing movements involves recognizing repositioning of transmitting, or traceable, elements 115 of a wearable input device 125. In one instance, the wearable input device 125 is configured as a wearable apparatus that has one or more traceable elements 115, or a number of focus points, that may be tracked in order to accurately reproduce physical gestures articulated by the wearable input device. Generally, the traceable elements 115 are populated on the wearable input device 125 in locations (e.g., along the fingers) and in quantity (e.g., ten elements per data glove) to provide sufficient data points for recreation of the physical gesture 180. That is, position, or pattern, of the traceable elements 115 is designed such that coordinate representations 170 of the traceable elements 115 at temporal increments may accurately portray the physical gestures 180 being executed. In an exemplary embodiment, position-sensing device 145 captures the discrete spatial movements of the traceable elements 115 with respect to a local frame of reference (e.g., reference point 310 of FIG. 3) in real time. In another embodiment, the position-sensing device utilizes algorithms to recognize movements and to pick out data points from the movements.

In one instance, the wearable-input device 125 may comprise a virtual-reality glove, a data glove, a wired glove, a cyber glove, or any other glove-type input device for virtual-reality environments. In this instance, the traceable elements 115 may comprise sensors or nodes populated on the wearable-input device 125 such that discrete spatial movements, such as bending of fingers or waving of a hand, are captured as coordinate representations of the sensors or nodes. In an exemplary embodiment, the position-sensing device in the position-tracking interface 145 is coupled to point recognition software (e.g., position recognition application 140), as opposed to standard video-filming software. In this way, the point recognition software can distill each discrete spatial movement from data points collected from the sensors or nodes on a frame-by-frame basis without recording a large image file. By way of example, the point recognition software may map the data points of the traceable elements 115 on a data glove fitted on a human hand, where the traceable elements 115 are populated on the wearable input device 125 (e.g., data glove) in a pattern to communicate sign language. In this example, mapping the data points involves capturing spatial positions of the traceable elements 115, with respect to a frame of reference, while disregarding corollary information (e.g., audio, color, background motion, and data important to typical video sessions) that is unnecessary when conveying sign language.

In one example of capturing the data points of the traceable elements 115 without recording the corollary information, the position-tracking interface 145 may capture the discrete spatial movements of ten of the sensors on a data glove utilizing approximately 4 bits per pixel or sensor. If the discrete spatial movements are captured at a rate of 30 frames per second, then the aggregate bandwidth required for capturing the physical gesture 180 is approximately 1200 bits per second. Accordingly, this low bit rate can characterize the physical gesture 180 within a fast frame rate, in order to provide sufficient video quality for communicating hand gestures such that they may be accurately recognized by a user. But, this low bit rate may be conveyed as streaming data over a conventional wireless communication path without the need for high-bandwidth channels (e.g., wired IP connections) that are typically required to support a sign language conversation over a video session.

Although various different configurations of the wearable input device 125 have been described, it should be understood and appreciated by those of ordinary skill in the art that other types of suitable devices that wired or wirelessly communicate a physical gesture 180 may be used, and that embodiments of the present invention are not limited to those data gloves with traceable elements 115 described and illustrated herein. For instance, the wearable input device 125 may comprise acceleration-sensing elements (e.g., accelerometers) that can attach directly or indirectly to the body of the user 105. In this instance, the physical gesture 180 is monitored by speed, acceleration, and timing of movements, which may be translated to coordinate representations 170 of the physical gesture. Accordingly, the "wearable input device" 125, as utilized herein, is not meant to be limiting but may encompass any technology that can express a movement (e.g., physical gesture 180, sign-language letter/term/phrase, position of a hand, direction of a palm, figure of a hand, etc.) to the position-tracking interface 145 in terms of data points. Consequently, the phrase "position tracking interface" 145 is not meant to be limited by the embodiments described, but is meant to be interpreted to broadly encompass any number of components, hardware (e.g., position sensing device), and techniques for gathering data points on a frame-by-frame basis that describe positions (e.g., positional relations between fingers) and/or movements (e.g., fluctuations or displacements of fingers) of the user 105.

The position tracking interface 145 may be operably coupled to, or integrated with, the source device 120. The source device 120 accommodates the position tracking interface 145 that transforms the captured data points to coordinate representations of the user-initiated physical gestures 180 at a high-speed frame rate. In addition, the position tracking interface 145 may be operably coupled to position-recognition software 140 installed on the source device 120. In general, the position recognition application 140 employed by the source device 120 is configured for generating the coordinate representations 170 for each of the traceable elements 115 at the high-speed frame rate. In embodiments, the coordinate representations 170 are generated in accordance with a three-dimensional coordinate system originating from the local frame of reference, as discussed above.

In operation, the position recognition application 140 is configured to convert the data points recorded by the position-tracking interface 145 to the coordinate representations 170. Generally, converting is accomplished by measuring spatial location of the traceable elements 115 against either each other or a fixed reference point. Measuring the spatial location of the traceable elements 115 against each other involves tracking movements of individual traceable elements 115 in relation to each other; thus, local coordinate representations 170 are created. Measuring spatial location of the traceable elements 115 against a fixed reference point, such as the reference point 310 of FIG. 3, involves setting a static point in a room or within the perspective of the position-tracking interface 145, and fixing the static point as the origin of a two- or three-dimensional coordinate system, thereby anchoring the x and y, possible and z coordinates. Accordingly, global coordinate representations 170 of the physical gesture 180 are created.

Additionally, the process of conversion may include scanning in the data points and translating the data points to coordinate representations 170. Further, in embodiments, this process of conversion is automatically invoked in a predetermined number of intervals per second, in accordance with a predefined frame rate. In this way, the user-initiated gestures 180 are dynamically translated to the coordinate representations 170 in real-time. By way of example, the predefined frame rate may be a high-speed frame rate of over 14 frames per second. In other examples, the high-speed frame rate captures more frames per temporal increment than a frame rate of a conventional video-media stream. In yet other examples, the high-speed frame rate captures instances of the user-initiated physical gestures 180 at a rate between 15 and 30 frames per second; thereby recording at a rate that will capture a rich set of information to support reproduction of sign-language movements (e.g., letters, terms, phrases, expressions, and the like) in a manner that is easily understood and interpreted by a recipient user.

Figure 2:
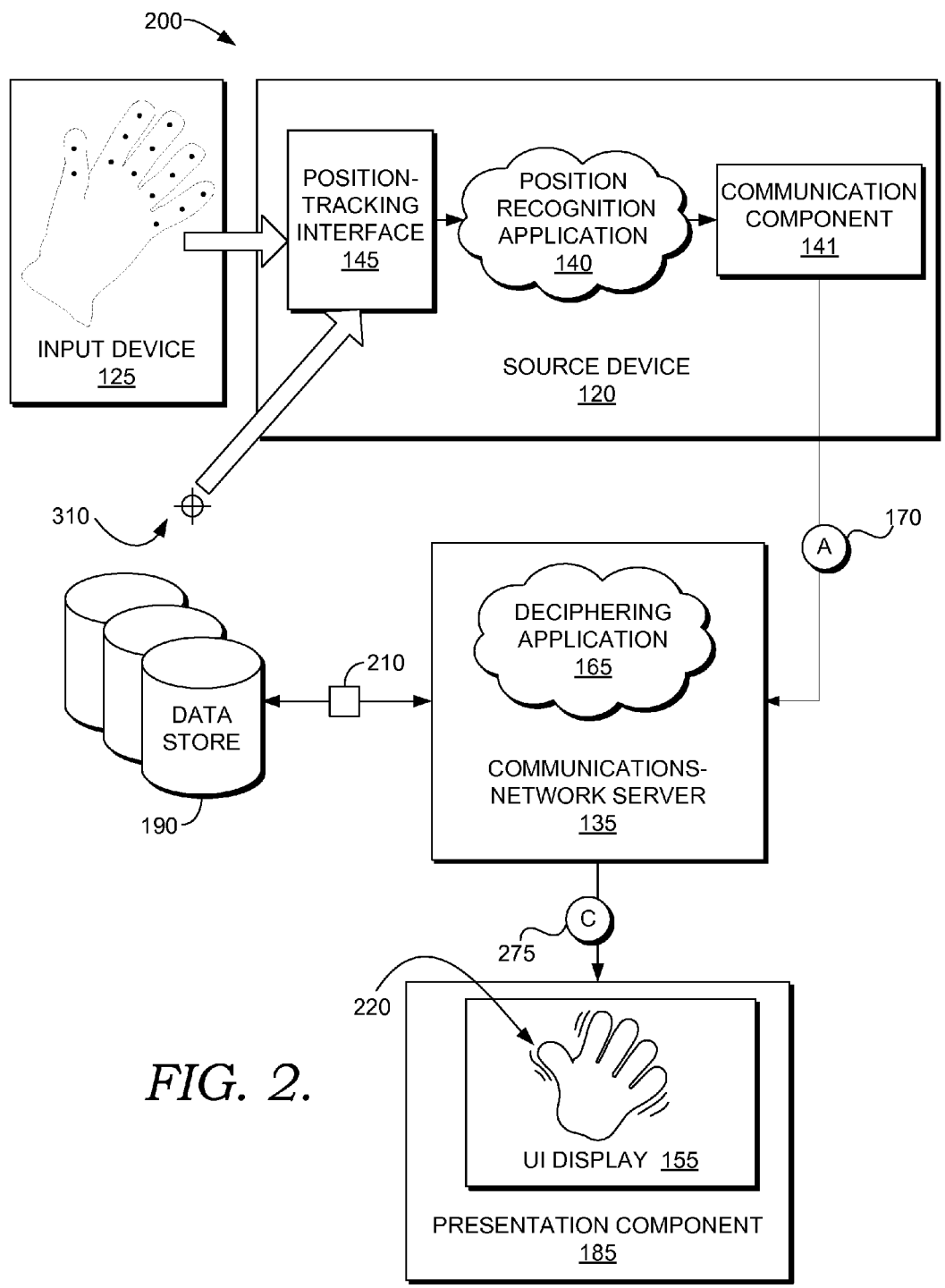
FIG. 2 is a block diagram of an exemplary system architecture suitable for use in implementing embodiments of the present invention where bandwidth of a communication pathway is sufficient to support streaming media.

In embodiments of the present invention, the communication component 141 of FIG. 2 is configured for compressing the coordinate representations 170 into reduced-bandwidth streaming data. Generally, the streaming data is conveyed from the source device 120 via the wireless connection 110. In an exemplary embodiment, the reduced-bandwidth streaming data is conveyed at a bit rate that is less than that of streaming video media. That is, because the streaming data being transmitted comprises spatial coordinates (e.g., coordinate representations 170 of physical gestures 180), the size of the data is substantially less than image data, thus, obviating the need for video codec compression.

The streaming data allows for wireless communication of the one or more physical gestures 180 to the communications network server 135 at a fixed number of intervals per second as defined by the frame rate. In response, the communications network server 135 may decipher the coordinate representations 170 of the physical gestures 180 to identify corresponding motion patterns 175, as more fully discussed below. In embodiments, the streaming data may comprise data packets. As discussed herein, the phrase "data packet" is not meant to be limiting but may encompass any formatted unit or piece of information. By way of example, a data packet may include a sequence of bytes and consist of contents including a header followed by a body. The header describes the data packets destination and, optionally, the routers to use for forwarding until it arrives at its target destination (e.g., destination device 130, communications-network server 135, and the like). The body typically contains the information (e.g., coordinate representations 170, motion patterns 175, or any other information that describes a movement) which the data packet is transmitting.

The communication component 141, in embodiments, may be further configured to perform various tasks in order to prepare the coordinate representations 170 for transmission as a data stream. As discussed above, the communications component 141 may compress the coordinate representations 170 into reduced-bandwidth streaming data. The streaming data may be encoded to facilitate conveyance to a target device. Conveying the coordinate representations 170 via a wireless network 110 may further include appending a time stamp, or other sequence identifier, to each of the coordinate representations 170, thereby temporally organizing the coordinate representations 170 for deciphering and rendering. In one instance, the sequence identifiers may be attached to the coordinate representations 170 at the frame rate in which they were captured.

In addition, other tasks performed by the communication component 141 may include interpolating positions of the traceable elements 115 that are not captured as coordinate representations 170 during each discrete spatial movement. By way of example, interpolation may include presuming mid points exist between the two end points of a fast movement. Accordingly, the interpolation provides error correction if movements are faster than the frame rate and helps to eliminate the jerkiness or other incongruence between discrete spatial movements. These interpolated positions may be communicated as coordinate representations 170 generated by the communication component. Also, the communication component 141, upon receiving an indication of the traceable elements 115 tracked at high-speed frame rate, may perform the task of applying a smoothing algorithm to captured coordinate representations 170 of the physical gestures 180, thereby filtering movements unrelated to sign language. In this way, filtering extraneous gestures that are not integral to sign language assists in distilling hand-recognized signing hand movements, thereby increasing the accuracy of the signs reproduced from the coordinate representations 170.

Upon receiving the streaming data, the communications-network server 135 is generally configured to process the captured movements (e.g., coordinate representations 170) and to extract motion patterns 175 (e.g., predefined sign movements) by converting the coordinate representations 170 of the physical gestures 180 using gesture recognition. In one instance, converting the coordinate representations 170 may include transcribing the signs represented through sign language into corresponding blocks of video via a mapping procedure.

In another instance, the process of converting may include deciphering the received coordinate representations 170 to identify corresponding motion patterns 175. In embodiments, deciphering includes translating the coordinate representations 170 of the data stream at the high-speed frame rate that conveys more frames per temporal increment than a frame rate of a video-media stream. Generally, deciphering allows for digitizing the physical gestures 180 by matching coordinate representations 170 against known patterns of movement or by applying rules, heuristics, or algorithms to convert the coordinate systems into a motion pattern 175. The deciphered motion patterns may then be conveyed to a presentation component 185 of the destination device 130 for rendering. As more fully discussed below, rending may involve replicating the physical gestures 180 by providing animations on a UI display 155 that correspond to the motion patterns 175.

In a particular embodiment, matching coordinate representations 170 against known patterns of movement may include comparing the coordinate representations 170 against motion patterns 175 located in a library 195 accommodated by a data store 190. In one instance, comparing includes grouping a set of coordinate representations 170 together (e.g., by discrete spatial movements of the complete physical gesture 180) and mapping the group to a set of sign language template images in library 195. In another instance, comparing includes identifying corresponding predefined motion patterns 175 by executing one or more of the following steps: aggregating the coordinate representations 170 of the each of the physical gestures 180 into a data collection; accessing the searchable library 195 of the motion patterns 175 at the data store 190; inspecting the library 195 with the data collection; and based on the inspection, ascertaining at least one motion pattern of the predefined motion patterns 175 that maps to the discrete movement of the user 105. By way of example, the data collection defines one discrete spatial movement of a user 105. The motion patterns 175 may be predefined based on letters, terms, phrases that are standard to sign language, or may be predetermined using any other criteria associated with movement of a user 105 (e.g., lip movement to enable lip readers to communicate over a reduced-bandwidth data stream). These motion patterns 175 may then be communicated over the wireless network 110 to the destination device 130. By way of example, communication may comprise transmitting the motion patterns 175 as a video signal such that the physical gestures corresponding thereto are conveyed in a standardized or generic format.

In embodiments, the data store 190 is configured to accommodate the library 195 for storing a catalog of the predefined motion patterns 175 that, incident to interrogation with the coordinate representations 170, yields at least one motion pattern 175 from the catalog which substantially maps to the coordinate representations 170, or at least a group/aggregation thereof. The data store 190 is generally configured to store information associated with the motion patterns 175 and the process of deciphering, discussed above. In various embodiments, such information may include, without limitation, a graphical depiction of a movement, features of the graphical depiction (e.g., hand motion, frame-by-frame movement of an avatar, and the like), one or more candidate signs and/or other forms of media (e.g., audio files associated with groups of coordinate representations 170). In addition, the data store 190 may be configured to be searchable for suitable access of stored information. For instance, the data store 190 may be searchable for one or more motion patterns 175 associated with ASL. It will be understood and appreciated by those of ordinary skill in the art that the information stored in the data store 190 may be configurable and may include any information relevant to the deciphering process. The content and volume of such information are not intended to limit the scope of embodiments of the present invention in any way. Further, though illustrated as a single, independent component, the data store 190 may, in fact, be a plurality of databases, for instance, a database cluster, portions of which may reside on a destination device 130, the source device 120, the communications-network server 135, another external computing device (not shown), and/or any combination thereof.

The destination device 130, is generally configured to receive the motion patterns 175. The destination device 130 may include a presentation component 165 and, in embodiments, a deciphering application 185. As discussed above, destination device 130 may comprise a mobile device (e.g., mobile phone, handheld device, personal digital assistant (PDA), BlackBerry®, smartphone, digital camera, or other mobile devices capable of communicating wirelessly) interconnected to the wireless network 110. The deciphering application 185 may perform one or more of the processes performed by the communications-network server 135, if not installed at the communications-network server 135, such as deciphering the received coordinate representations 170 to identify corresponding motion patterns 175. This embodiment is described more fully below with reference to FIG. 3.

In an exemplary embodiment, the presentation component 185 is configured to reconstruct the physical gestures 180 by presenting animations (e.g., animation 220 of FIGS. 2 and 3) of the motion patterns 175. In one instance, reconstructing involves rendering the animation within a display area 160 of the UI display 155 by replicating the physical gestures 180 that correspond to the motion patterns 175. By way of example, replicating my include modeling the coordinate representations 170 of discrete spatial movements (e.g., hand performing sign language) as a video sequence of motions articulated by computer-generated objects (e.g., signing by artificial hands). In another instance, reconstructing includes revealing the motion pattern 175 as text on the UI display 155 or as any other dynamic indications that communicate information that can be surfaced on a UI display 155. By way of example, reconstructing utilizing dynamic indications may comprise decoding the motion pattern 175 of the incoming data stream to determine the movement of a pair of generic hands (e.g., block gloved hands like Mickey Mouse) that are manipulated to reproduce the physical gestures 180.

In another example, reconstructing utilizing dynamic indications may comprise recreating the discrete spatial movements with an avatar. Generally, as used herein, the term "avatar" is not meant to be limiting, but may encompass objects that serve as digital representations of the user 105. These objects may reside in two- or three-dimensional space. The avatar may further include any known on-screen representation of the motion pattern 175, such as a text construct or virtual body that simulates the human form—not necessarily specific to the user 105—that serves the purpose of representing the users 105 and their actions.

In other embodiments, the presentation component 185 is capable of presenting data indications to a user on a monitor 150 operably coupled to the destination device 130. By way of example, the presentation component 185 may interact with a monitor 150 that surfaces the animated computer-generated model at the user-interface (UI) display 155. In instances, the animated computer-generated model includes the avatar of user hands that substantially reproduce aspects of the physical gestures 180, thereby rendering the coordinate representations 170 at the UI display 155. In yet other embodiments, the presentation component 185 is operable coupled to other display devices, speakers, printing components, vibrating components, etc., for expressing the motion patterns 175 to the user.

Although various different configurations of the presentation component 185 have been described, it should be understood and appreciated by those of ordinary skill in the art that other types of suitable components that interact with the device(s) that present and/or reconstruct the physical gestures 180 (e.g., presenting animations of the motion patterns 175) may be used, and that embodiments of the present invention are not limited to those presentation components 185 described herein.

This exemplary operating environment designated generally as the system 100 within a wireless network architecture is but one example of a suitable system that may be implemented to carry out aspects of the present invention, and is not intended to suggest any limitation as to the scope of use or functionality of the invention. Neither should the illustrated exemplary system 100 be interpreted as having any dependency nor requirement relating to any one or combination of the components 140, 141, 145, 135, 165, 185, and 195 as illustrated. In some embodiments, one or more of the components 140, 141, 145, 135, 165, 185, and 195 may be implemented as stand-alone devices (e.g., the deciphering application 165 may be interconnected between the source device 120 and the destination device 130 on a network-provided processor). In other embodiments, one or more of the components (e.g., the communication component 141 and/or the library 195) may be integrated directly into the wireless network 110 of FIG. 1. It will be understood by those of ordinary skill in the art that the components 140, 141, 145, 135, 165, 185, and 195 illustrated in FIG. 1 are exemplary in nature and in number and should not be construed as limiting.

Accordingly, any number of components may be employed to achieve the desired functionality within the scope of embodiments of the present invention. Although the various components of FIG. 1 are shown with lines for the sake of clarity, in reality, delineating various components is not so clear, and metaphorically, the lines would more accurately be grey or fuzzy. Further, although some components of FIG. 1 are depicted as single blocks, the depictions are exemplary in nature and in number and are not to be construed as limiting (e.g., although only one source device 120 and one destination device 130 are shown, many more may be communicatively coupled to the wireless network 110).

Further, the components of the exemplary system 100 may be interconnected by any method known in the relevant field. For instance, the source device 120 and destination device 130 may be operably coupled via a distributed communications environment. In embodiments, the wireless network 110 of FIG. 1 may include, without limitation, one or more local area networks (LANs) and/or wide area networks (WANs). Such networking environments are commonplace in offices, enterprise-wide computer networks, intranets, and the Internet.

In yet other embodiments, the wireless network 110 of FIG. 1 may couple components 140, 141, 145, 135, 165, 185, and 195 of FIG. 1, thereby forming a distributed computing environment where tasks are performed by remote-processing devices that are linked through appropriate connections. These connections may be established by wired technologies, wireless technologies, or a combination thereof. Examples of particular wired embodiments, within the scope of the present invention, include USB connections and cable connections. Examples of particular wireless embodiments, within the scope of the present invention, include a near-range wireless network and radio-frequency technology. It should be understood and appreciated that the designation of "near-range wireless network" is not meant to be limiting, and should be interpreted broadly to include at least the following technologies: negotiated wireless peripheral (NWP) devices; short-range wireless air interference networks (e.g., wireless personal area network (wPAN), wireless local area network (wLAN), wireless wide area network (wWAN), Bluetooth™, and the like); wireless peer-to-peer communication (e.g., Ultra Wideband); and any protocol that supports wireless communication of data between devices. Additionally, persons familiar with the field of the invention will realize that a near-range wireless network may be practiced by various data-transfer methods (e.g., satellite transmission, telecommunications network, etc.) that are different from the specific illustrated embodiments. Therefore it is emphasized that embodiments of the connections between components are not limited by the examples described, but embrace a wide variety of methods of communications.

Referring to FIG. 2, a block diagram of an exemplary system architecture 200 suitable for use in implementing embodiments of the present invention is shown, where bandwidth of a communication pathway is sufficient to support streaming media. It will be understood and appreciated by those of ordinary skill in the art that the exemplary system architecture 200 shown in FIG. 2 is merely an example of one suitable computing environment and is not intended to suggest any limitation as to the scope of use or functionality of the present invention. Neither should the exemplary system architecture 200 be interpreted as having any dependency or requirement related to any single component or combination of components illustrated therein.

Initially, one or more of the components depicted in FIG. 2 is configured to carry out the step of detecting a bandwidth of a communication pathway that operably couples the source device 115 (e.g., mobile device) with the presentation component 185 of the destination device 130 of FIG. 1. Upon detecting the bandwidth of channels in the wireless network, a decision may be made as to whether the coordinate representations 170 may be converted to video messages 275 (e.g., recreated images of the physical gesture 180 of FIG. 1) prior to distribution to the destination device. This decision is influenced by a determination of whether the destination device is capable of functionality that can convert coordinate representations 170 to video. By way of example, a high-speed modem may be connected to a set-top box (e.g., destination device 130 of FIG. 1) that has no application installed thereon for converting, but can easily receive video messages.

When the bandwidth is sufficient for supporting streaming video media and or the destination device 130 cannot convert data streams to images, the deciphering application 250 may be installed on the communications network server 135 for intercepting the coordinate representations 170. In other embodiments, the communication-network server 135 may include network elements, which are removed from the presentation component 185, that convert the coordinate representations 170 within the data stream into a video signal 275. These network elements may interact with the deciphering application 165 and perform one or more of the following processes, in no particular order: intercepting the data stream that carries the coordinate representations 170 from the communication component 141; translating the coordinate representations 170 to a video message 275 by way of mapping to motion patterns to the coordinate representations 170; mapping the motions patterns by interrogating a library on the data store 190; and transmitting the video message 275 as media over the data stream. Accordingly, in these embodiments, the communication-network server 135 is utilized to implement the process of deciphering the received coordinate representations 170 and convey the video messages 275 from the communication-network server 135 to the presentation component 185 as media via a communication pathway of the wireless network.

Figure 3:
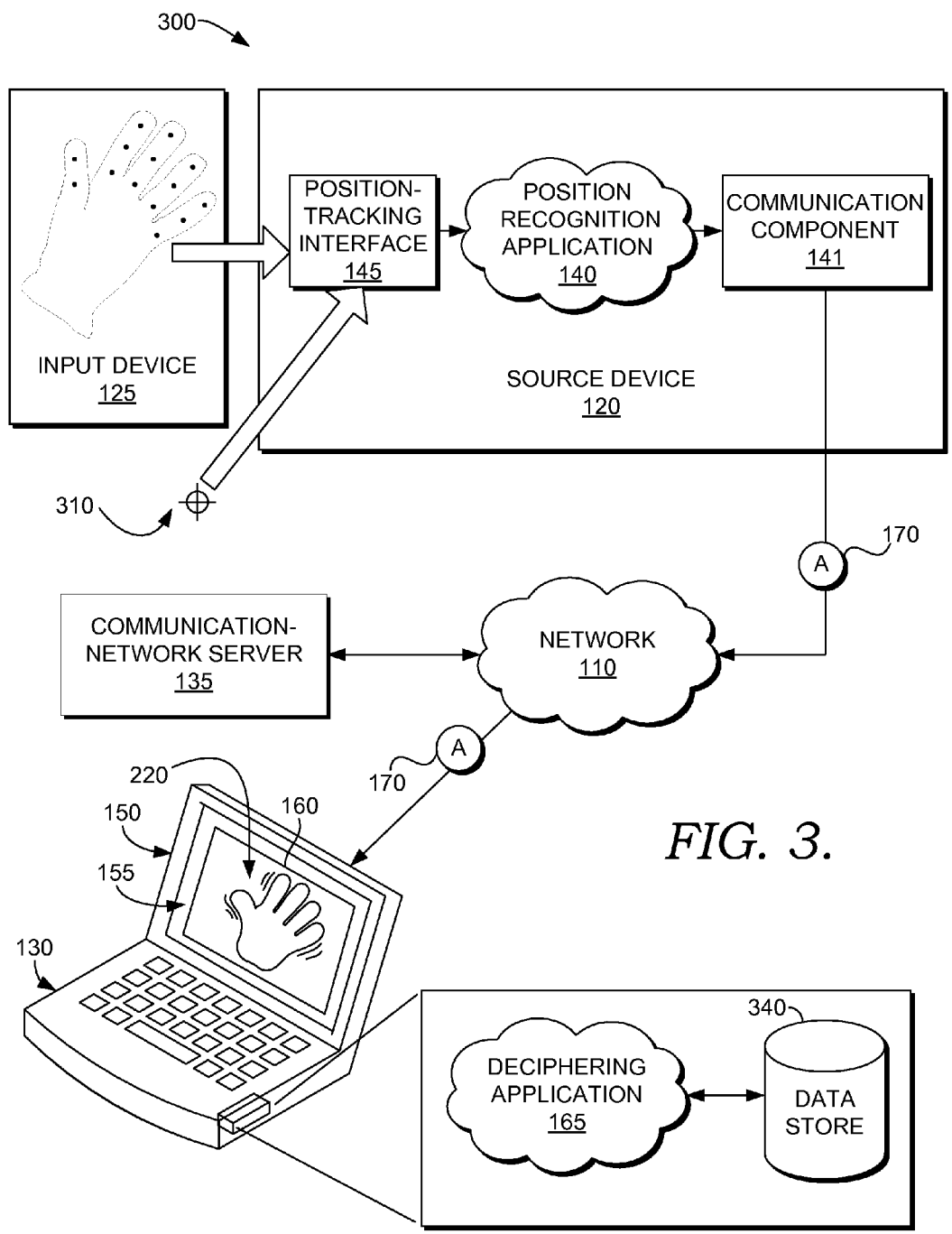
FIG. 3 is a block diagram of an exemplary system architecture suitable for use in implementing embodiments of the present invention where bandwidth of a communication pathway is insufficient to support streaming media.

Turning now to FIG. 3, when the bandwidth of the communication pathways of the wireless network is insufficient for supporting streaming video media and the destination device 130 is capable of converting coordinate representations 170 to a video image, the deciphering application 165 may be locally connected to the destination device 130, thereby avoiding sending video messages as media over a slow communication pathway. Generally, FIG. 3 is a block diagram of an exemplary system architecture 300 suitable for use in implementing embodiments of the present invention where bandwidth of a communication pathway is sufficient to support streaming media. As discussed above, the deciphering application 165 is capable of deciphering the received coordinate representations 170. In instances, deciphering may include intercepting the coordinate representations 170 at the deciphering application 165, and utilizing the deciphering application 165 to implement the process of deciphering the received coordinate representations 170, thereby obviating conveyance of streaming video messages as media across the wireless network 110.

The process of deciphering may include mapping the coordinate representations 170 to motion patterns via a local data store 340, and converting the motion patterns to video images. These video images may be displayed on the UI display 155 surfaced by the monitor 150. In addition, the video images may comprise an animation 220 of an avatar revealed within a display area 160. The monitor 150, which may be operably coupled to the processing component 185 of FIG. 1, may be configured as any input/output device capable of revealing information to a user and gathering information from a user (as illustrated in FIG. 3), or may be physically separated from the destination device 130 as a stand-alone unit. In embodiments, the monitor 150 may be a device adapted to present content (e.g., video images or other media) to a user, such as an electronic display panel, touch-screen, liquid crystal display (LCD), plasma screen, one or more light-emitting diodes (LED), incandescent bulbs, a laser, an electroluminescent light source, a chemical light, a flexible light wire, and/or fluorescent light, or any other display type, or may comprise a reflective surface upon which the visual information is projected. In one exemplary embodiment, a UI display 155 rendered by the monitor 150 is configured to present a display area 160 capable of rendering or launching one or more animations 220.

Figure 4:
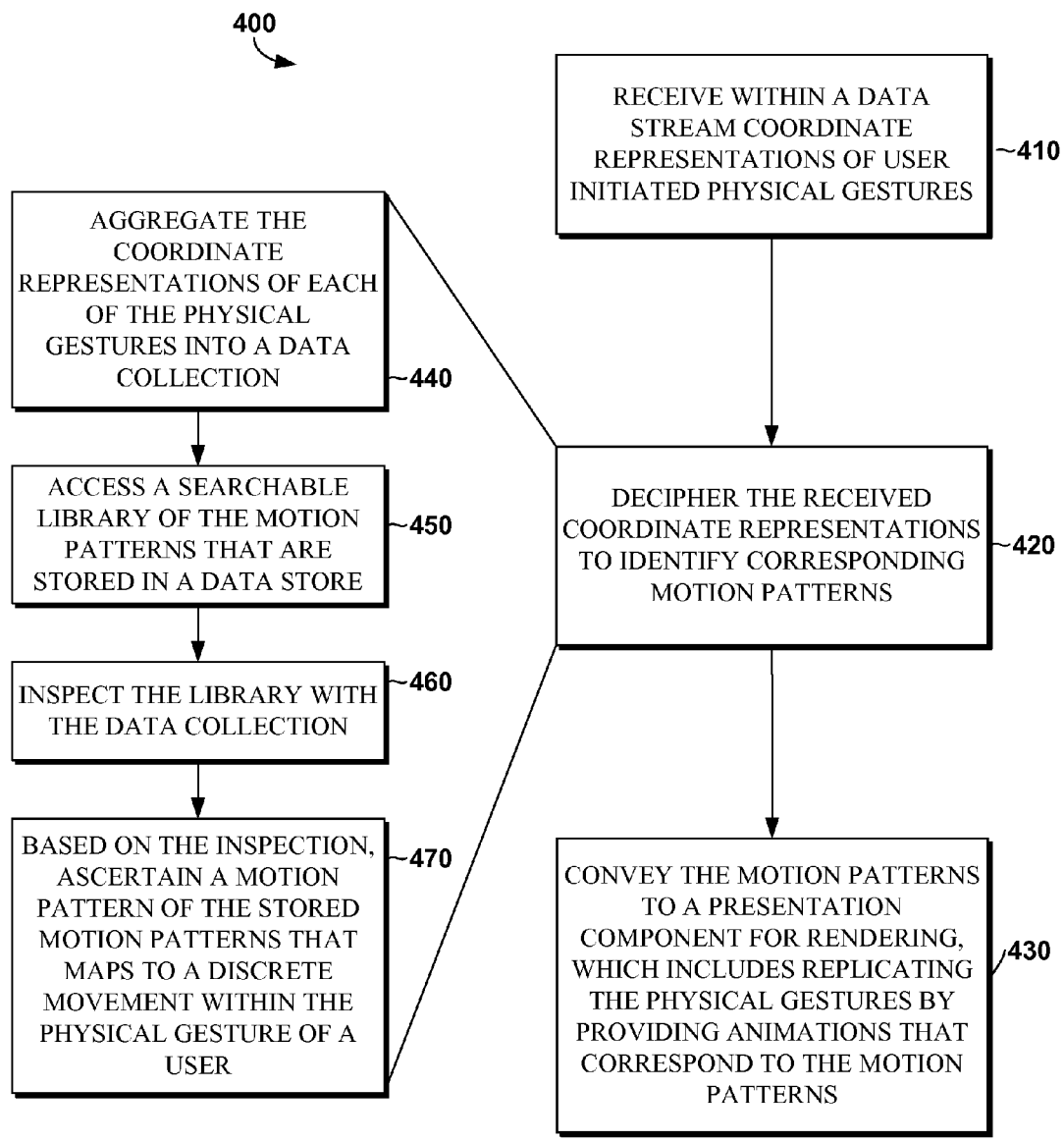
FIG. 4 is a flow diagram showing an overall method for communicating physical gestures from a communications-network server across a wireless network as a data stream, in accordance with an embodiment of the present invention.

Turning now to FIG. 4, a flow diagram is shown illustrating an overall method 400 for communicating physical gestures (e.g., physical gesture 180 of FIG. 1) from the communications-network server 135 of FIGS. 1-3 across the wireless network 110 of FIG. 1 as a data stream, in accordance with an embodiment of the present invention. Although the terms "step" and "block" are used hereinbelow to connote different elements of methods employed, the terms should not be interpreted as implying any particular order among or between various steps herein disclosed unless and except when the order of individual steps is explicitly described. Initially, as indicated at block 410, coordinate representations are received within the data stream, where the coordinate representation indicate one or more user-initiated physical gestures captured by the position-tracking interface 145 of the source device 120 of FIG. 1. Typically, the physical gestures are captured by a process that includes at least temporarily, recording the coordinate representations at a high-speed frame rate (e.g., 14 frames per second). In embodiments, the high-speed frame rate captures instances of the user-initiated physical gestures at a rate between 15 and 30 frames per second.

As depicted at bock 420, the received coordinate representations are deciphered to identify corresponding motion patterns (e.g., utilizing the deciphering application 165 of FIGS. 1-3). Generally, deciphering includes translating the coordinate representations of the data stream at the high-speed frame rate, where the high-speed frame rate captures more frames per temporal increment than a frame rate of a video-media stream. In embodiments, deciphering includes one or more of the following steps, in no particular order: aggregating the coordinate representations of the each of the physical gestures into a data collection, where the data collection defines a discrete spatial movement of a user (see block 440); accessing a searchable library of the motion patterns at a data store (see block 450), wherein the motion patterns are predefined; inspecting the library (e.g., utilizing the library 195 of the data store 190 of FIG. 1) with the data collection (see block 460); and, based on the inspection, ascertaining a motion pattern of the predefined motion patterns that maps to the discrete movement of the user (see block 470). As depicted at block 430, the motion patterns are conveyed to a presentation component (e.g., utilizing presentation component 185 of FIG. 1) for rendering, which includes replicating the physical gestures by providing animations that correspond to the motion patterns.

Figure 5:
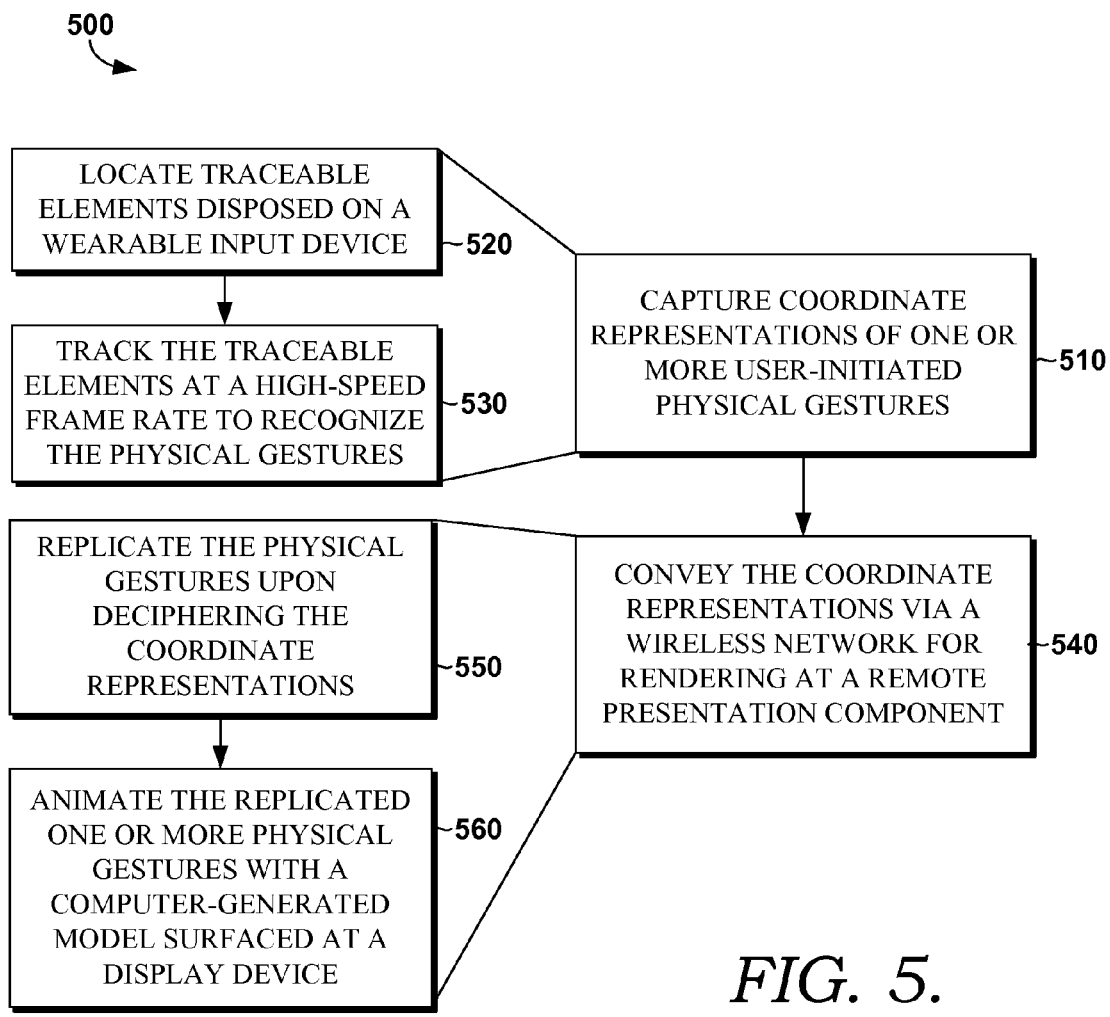
FIG. 5 is a flow diagram showing an overall method for communicating sign language across a wireless network by way of capturing at a mobile device coordinate representations of user-initiated physical gestures, in accordance with an embodiment of the present invention.

Referring to FIG. 5, a flow diagram is shown illustrating an overall method 500 for communicating sign language across a wireless network by way of capturing at a mobile device coordinate representations of user-initiated physical gestures, in accordance with an embodiment of the present invention. Initially, the method 500 includes capturing coordinate representations of one or more user-initiated physical gestures that are associated with a sign language that utilizes hand gesturing to communicate, as depicted at block 510. In one embodiment, capturing includes recording the discrete spatial movements of the traceable elements with respect to a local frame of reference in real time, and generating the coordinate representations for each of the traceable elements in accordance with a three-dimensional coordinate system originating from the local frame of reference. In a second embodiment, capturing includes locating traceable elements disposed on a wearable input device (see block 520), and tracking the traceable elements at high-speed frame rate to recognize the one or more physical gestures (see block 530). Generally, the physical gestures comprise discrete spatial movements of the wearable input device. Tracking the traceable elements at high-speed frame rate may include interpolating positions of the traceable elements that are not captured during each discrete spatial movement. In other embodiments, tracking the traceable elements at high-speed frame rate comprises applying a smoothing algorithm to captured frames of the physical gestures, thereby filtering movements unrelated to sign language.

The method 500, in embodiments, further includes conveying the coordinate representations via a wireless network for rendering at a remote presentation component. This is depicted at block 540. In embodiments, rendering includes replicating the physical gestures upon deciphering the coordinate representations (see block 550), and animating the replicated one or more physical gestures with a computer-generated model surfaced at a display device (see block 560). Further, conveying the coordinate representations via a wireless network may further include one or more of the flowing steps: compressing the coordinate representations for communication as a data stream; or appending a time stamp to each of the coordinate representations, thereby temporally organizing the coordinate representations for rendering.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well-adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer-readable media having computer-executable instructions embodied thereon that, when executed, perform a method for communicating physical gestures across a wireless network as a data stream, the method comprising:
   receiving within the data stream coordinate representations of one or more user-initiated physical gestures captured by a position-tracking interface of a mobile device, wherein the physical gestures are captured by a process that includes at least temporarily, recording the coordinate representations at a high-speed frame rate that is greater than about 14 frames per second;
   determining that bandwidth is unavailable for the data stream of the coordinate representations such that the coordinate representations are converted into reduced bandwidth streaming data based in part on isolating the coordinate representations from corollary information;
   deciphering the coordinate representations to identify corresponding predefined motion patterns via a mapping procedure comprising:
   (1) aggregating the coordinate representations that correspond to a particular one of the physical gestures; and
   (2) comparing, the aggregated coordinate representations against a library of predefined motion patterns to determine a match;
   upon identifying corresponding predefined motion patterns each being a graphical depiction of movement, conveying the predefined motion patterns different from a composite of the original image to a presentation component for rendering; and generating animations from the graphical depiction of movement of each of the predefined motion patterns that match the coordinate representations of the one or more physical gestures in replicating the one or more physical gestures.

2. The media of claim 1, wherein deciphering comprises translating the coordinate representations of the data stream at the high-speed frame rate, wherein the high-speed frame rate captures more frames per temporal increment than a frame rate of a video-media stream.

3. The media of claim 2, wherein the high-speed frame rate captures instances of the one or more user-initiated physical gestures at a rate between 15 and 30 frames per second.

4. The media of claim 1, wherein deciphering the received coordinate representations to identify corresponding predefined motion patterns comprises:
   aggregating the coordinate representations of the each of the one or more physical gestures into a data collection, wherein the data collection defines a discrete spatial movement of a user;
   accessing a searchable library of the motion patterns at a data store, wherein the motion patterns are predefined;
   inspecting the library with the data collection; and
   based on the inspection, ascertaining a motion pattern of the predefined motion patterns that maps to the discrete movement of the user.

5. The media of claim 1, the method further comprising detecting a bandwidth of a communication pathway that operably couples the mobile device with the presentation component.

6. The media of claim 5, the method further comprising:
   when the bandwidth is sufficient for supporting streaming video media, intercepting the coordinate representations at a communication-network server that is removed from the presentation component;
   utilizing the communication-network server to implement the process of deciphering the received coordinate representations; and
   conveying the motion patterns from the communication-network server to the presentation component as the video media stream via the communication pathway.

7. The media of claim 5, the method further comprising:
   when the bandwidth is insufficient for supporting streaming video media, ascertaining that a deciphering application is locally connected to the presentation component and is configured to decipher the received coordinate representations;
   intercepting the coordinate representations at the processing component; and
   utilizing the processing component to implement the process of deciphering the received coordinate representations, thereby obviating conveyance of streaming video media across the wireless network.

8. A computerized method for communicating sign language across a wireless network, the method comprising:
   capturing coordinate representations of one or more user-initiated physical gestures that are associated with a sign language that utilizes hand gesturing to communicate, wherein capturing comprises:
   (a) locating traceable elements disposed on a wearable input device; and
   (b) tracking the traceable elements, at high-speed frame rate to recognize the one or more physical gestures, wherein the one or more physical gestures comprise discrete spatial movements of the wearable input device; and
   conveying the coordinate representations via a wireless network for rendering at a remote presentation component, wherein rendering comprises:
   (a) replicating the one or more physical gestures upon deciphering the coordinate representations; wherein replication involves comparing the coordinate representations against a library of predefined motion patterns, each being a graphical depiction of movement, to determine a match; and
   (b) generating animations from the graphical depiction of movement of each of the predefined motion patterns that correspond to the coordinate representations to render the one or more physical gestures with a computer-generated model surfaced at a display device.

9. The computerized method of claim 8, wherein tracking the traceable elements at high-speed frame rate comprises interpolating positions of the traceable elements that are not captured during each discrete spatial movement.

10. The computerized method of claim 8, wherein tracking the traceable elements at high-speed frame rate comprises applying a smoothing algorithm to captured frames of the one or more physical gestures thereby filtering movements unrelated to sign language.

11. The computerized method of claim 8, wherein capturing coordinate representations of one or more user-initiated physical gestures further comprises:
   recording the discrete spatial movements of the traceable elements with respect to a local frame of reference in real time; and
   generating the coordinate representations for each of the traceable elements in accordance with a three-dimensional coordinate system originating from the local frame of reference.

12. The computerized method of claim 8, wherein conveying the coordinate representations via a wireless network further comprises compressing the coordinate representations for communication as a data stream.

13. The computerized method of claim 8, wherein conveying the coordinate representations via a wireless network further comprises appending a time stamp to each of the coordinate representations thereby temporally organizing the coordinate representations for rendering.

14. A computer system for performing a method for rendering a computer-generated model of one or more physical gestures conveyed as reduced-bandwidth streaming data across a wireless network, the system comprising:
   a mobile device that includes a position-tracking interface that captures coordinate representations of the one or more user-initiated physical gestures at a high-speed frame rate;
   a communications-network server for receiving the coordinate representations carried via the reduced-bandwidth streaming data;
   a deciphering application embodied on one or more computer-readable media that assigns the received coordinate representations corresponding predefined motion patterns; and
   a presentation component that reconstructs the one or more physical gestures by presenting animations of the predefined motion patterns that correspond to the received coordinate representations.

15. The computer system of claim 14, further comprising a data store that accommodates a library for storing a catalog of the predefined motion patterns that, incident to interrogation with the coordinate representations, yields at least one motion pattern from catalogue which substantially maps to the coordinate representations.

16. The computer system of claim 14, further comprising a wearable input device that wirelessly communicates the one or more physical gestures to the position-tracking interface at a fixed number of intervals per second as defined by the frame rate, wherein the one or more physical gestures comprise discrete spatial movements of a user.

17. The computer system of claim 16, wherein the wearable input device comprises a data glove having traceable elements disposed thereon, and wherein the position-tracking interface comprises a position-sensing device that is configured for recording the discrete spatial movements of the traceable elements with respect to a local frame of reference in real time.

18. The computer system of claim 17 further comprising a position recognition application employed by the mobile device for generating the coordinate representations for each of the traceable elements at the high-speed frame rate, wherein the coordinate representations are generated in accordance with a three-dimensional coordinate system originating from the local frame of reference.

19. The computer system of claim 17, further comprising a communication component for compressing the coordinate representations into the reduced-bandwidth streaming data being conveyed from the mobile device, wherein the reduced-bandwidth streaming data is conveyed at a bit rate that is less than that of streaming video media.

20. The computer system of claim 17, wherein the presentation component interacts with a monitor that surfaces the animated computer-generated model at a user-interface (UI) display, and wherein the animated computer-generated model includes avatar hands that substantially reproduce aspects of the physical gestures, thereby rendering the coordinate representations at the UI display.

* * * * *